United States Patent Office.

GEORGE L. WITSIL, OF PHILADELPHIA, PENNSYLVANIA, ASSIGNOR TO THOMAS E. HAUBERGER, OF SAME PLACE.

Letters Patent No. 76,025, dated March 24, 1868.

COMPOSITION FOR SHARPENING EDGE-TOOLS.

*The Schedule referred to in these Letters Patent and making part of the same.*

TO ALL WHOM IT MAY CONCERN:

Be it known that I, GEORGE L. WITSIL, of Philadelphia, in the county of Philadelphia, and State of Pennsylvania, have invented a new and useful Composition for Use in Sharpening Edge-Tools; and I do hereby declare that the following is a full, clear, and exact description of the same.

This composition is intended for use in sharpening edge-tools, being formed into the usual shape of whetstones or grindstones, and used in the same manner. It is formed by taking potters' clay, and mixing thoroughly therewith about one-half the quantity thereof of finely-ground flint, using therefor the refuse material rejected in the manufacture of sand-paper, as being too fine for that use. The mixture is wet, and then moulded into any desired form, and then baked.

The peculiar consistency of the potters' clay is such that it will not glaze in use, and the particles of fine flint will sharpen the tool applied thereto. I know of no other materials which can be combined, producing the same results in an equally satisfactory manner.

What I claim as my invention, and desire to secure by Letters Patent, is—

A composition for sharpening tools, compounded and prepared substantially as set forth.

In testimony whereof, I have signed my name to this specification in the presence of two subscribing witnesses.

GEO. L. WITSIL.

Witnesses:
    JOHN S. HOLLINGSHEAD,
    JOHN D. BLOOR.